Patented Dec. 7, 1948

2,455,414

UNITED STATES PATENT OFFICE 2,455,414

ALUMINUM PHOSPHATE PHOSPHOR

Herman C. Froelich and Joseph M. Margolis, Cleveland Heights, Ohio, assignors to General Electric Company, a corporation of New York No Drawing. Application July 15, 1946, Serial No. 683,787

2 Claims. (Cl. 252—301.4)

Our invention relates generally to phosphors, that is, fluorescent or phosphorescent materials. More particularly our invention relates to a phosphor of aluminum phosphate activated by trivalent cerium.

A cerium-activated aluminum phosphate may be prepared to emit ultraviolet radiations of long wave length when excited by ultraviolet radiations of shorter wave length of 2537° A. But its brightness is so far below that of the cerium-activated calcium phosphate disclosed and claimed in Patent 2,306,567, W. A. Roberts, as to make it virtually a worthless product. However, according to the present invention, we have discovered that the incorporation of a small amount of thorium into the aluminum phosphate phosphor as a secondary activator results in an increase in brightness of the order of 70 per cent. The result is a phosphor of higher brightness than the calcium phosphate disclosed in the Roberts patent.

Our aluminum phosphate phosphor may be prepared according to the methods disclosed in the Roberts patent for the preparation of calcium phosphate phosphor. Using one per cent $ThO_2$ by weight as secondary activator, we find the brightest ultraviolet output in compositions having from about 12 to about 25 per cent $Ce_2O_3$ by weight. With 14 per cent $Ce_2O_3$, amounts of thoria as low as 0.1 per cent improved the output slightly while amounts as high as 20 per cent gave a product slightly inferior to the optimum range which seems to lie between about 0.2 per cent and 15 per cent $ThO_2$.

The thorium may be added to the raw batch, before firing, in the form of any suitable compound, preferably the nitrate.

By way of example, the following is a specific example of one method of preparing a phosphor comprising our invention. A mixture of 25.4 grams $Al(NO_3)_3 \cdot 9H_2O$, 3.6 grams $Ce(NO_3)_3 \cdot 6H_2O$ and 1.6 grams $Th(NO_3)_4 \cdot 4H_2O$ is dissolved in 200 ml. of water and brought to boiling. To this boiling solution is added 14.6 grams $(NH_4)_2HPO_4$ in 100 ml. of hot water. The solution is stirred vigorously, filtered and washed three times with hot water. After drying at 300° C. the product is crushed to pass a 100 mesh screen and fired for one hour at 1200° C. in a reducing atmosphere, preferably hydrogen and steam.

This phosphor when measured against a standard showed a brightness of 109 per cent in contrast to a control without added thorium which showed only 62 per cent.

The phosphor may be coated on the inner surface of a low pressure mercury vapor discharge lamp to convert the ultraviolet radiations of 2537° A. wave length in the discharge to longer ultraviolet radiations. Such a lamp is useful, for example, for blueprinting purposes or as a source of long wave ultraviolet for exciting other phosphors, particularly sulphides.

What we claim as new and desire to secure by Letters Patent of the United States is:

1. A fluorescent material consisting of aluminum phosphate activated by both cerium and thorium, the cerium content being approximately 12–25% $Ce_2O_3$ and the thorium content being approximately 0.2–15% $ThO_2$ and characterized by the emission of longer wave length ultraviolet radiations when excited by ultraviolet radiation of 2537 Å. wave length.

2. A fluorescent material consisting of aluminum phosphate activated by about 14% cerium and about 1% thorium and characterized by the emission of longer wave length ultraviolet radiation when excited by ultraviolet radiation of 2537 Å. wave length.

HERMAN C. FROELICH.
JOSEPH M. MARGOLIS.

REFERENCES CITED

The following references are of record in the file of this patent:

UNITED STATES PATENTS

| Number | Name | Date |
|---|---|---|
| 850,860 | Vanino | Apr. 16, 1907 |
| 2,049,765 | Fischer | Aug. 4, 1936 |
| 2,171,145 | Leverenz | Aug. 29, 1939 |
| 2,306,567 | Roberts | Dec. 29, 1942 |